June 10, 1952     D. N. WALKER     2,599,879
EXHAUST INDUCED COOLING SYSTEM FOR GAS TURBINES
Filed Aug. 23, 1945     2 SHEETS—SHEET 1
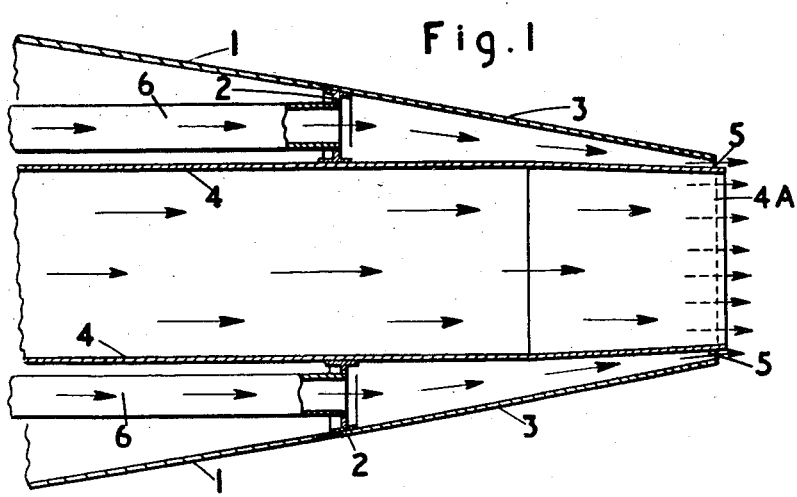
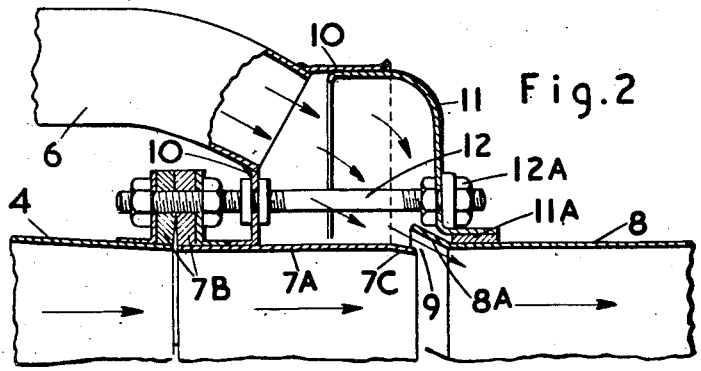
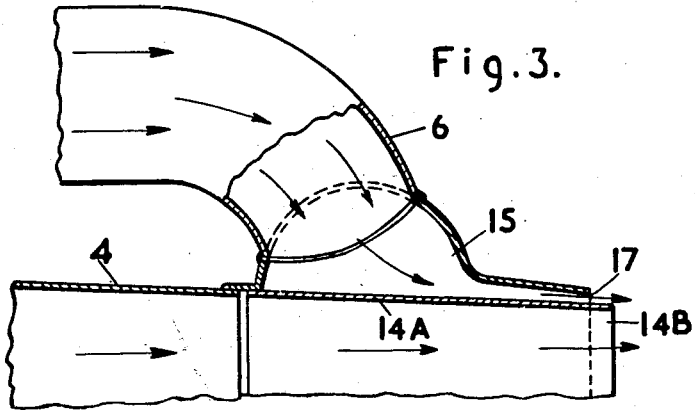
Inventor
Daniel Norman Walker
By
Stevens and Davis
his Attorneys

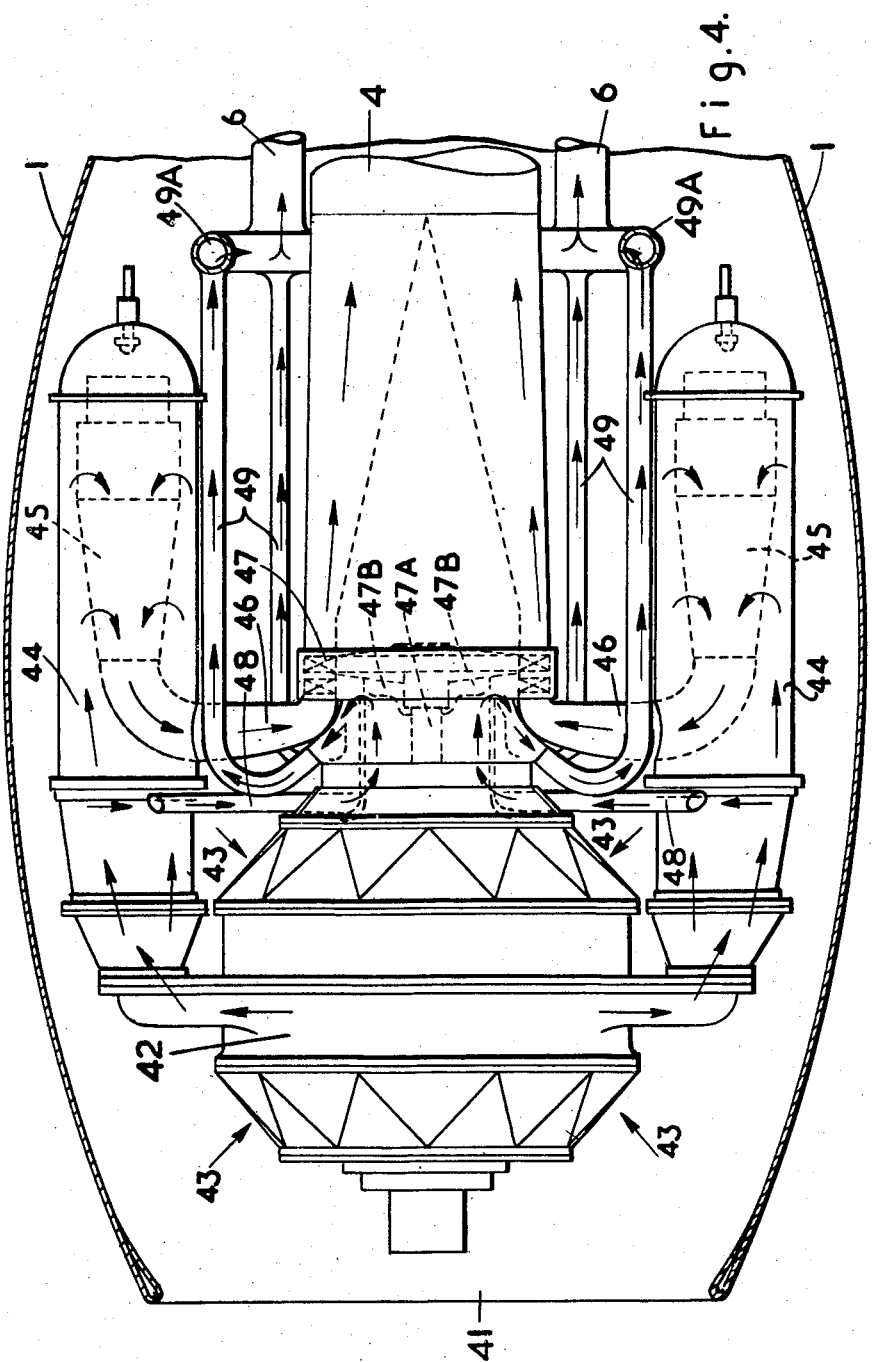

Patented June 10, 1952

2,599,879

UNITED STATES PATENT OFFICE 2,599,879

EXHAUST INDUCED COOLING SYSTEM FOR GAS TURBINES

Daniel Norman Walker, Ashby Parva, near Rugby, England, assignor to Power Jets (Research & Development) Limited, London, England Application August 23, 1945, Serial No. 612,182 In Great Britain May 13, 1942

3 Claims. (Cl. 60—35.6)

This invention relates to gas turbines and more particularly to cooling of parts thereof and also in secondary aspects to the installation thereof in aircraft as jet propulsion engines. Hitherto various expedients have been considered for cooling gas turbines; the function of a coolant in a gas turbine may go beyond the mere convection of heat since the coolant may be used as an insulating medium between parts which are necessarily hot and other parts which it is desired to keep relatively cool. Thus in one design it has been the practice to provide an overhung single row axial flow turbine supported by a bearing on the upstream side of the disc and to pass air around the bearing housing towards the disc, radially outwards across the surface of the disc and then through ducting to atmosphere, the flow in such case being induced by impeller vanes projecting from the surface of the disc axially co-operating with a row of stator vanes projecting from the parts which enclose and support the bearing housing. In the case of an aircraft installation the exhaust from the turbine is led by a coaxial jet pipe to the atmosphere and the expelled coolant air has been collected by a manifold and led to atmosphere, for instance through vents in the skin of a nacelle. Where the power unit is used in a nacelle or the equivalent in which pressure head is raised in accordance with forward speed the flow of coolant air, whilst it may be a function to some extent of rotational speed of the turbine, may also be dependent upon the forward speed. The present invention seeks to provide improvements in relation to the ducting and egress of the coolant air, both from the point of view of inducing the required rate of flow, and also from the point of view of installation in aircraft.

The invention resides primarily in a gas turbine having provision for flow of coolant air over or between its parts, for example through a turbine bearing housing and over a face of the turbine disc, in combination with an arrangement whereby the flow of coolant air is promoted or assisted by the exhaust stream. This is achieved by employing the principle of that type of "injector" in which one stream of fluid entrains and therefore imparts energy to a second stream. In the present case, the action may in some cases be that of an "injector" and in others it should perhaps more strictly be considered as an "ejector." Further the coolant air is preferably led into an annular chamber surrounding the exhaust pipe from the turbine, this chamber being an outlet so related to the exhaust stream as to achieve the required injector (the term including "ejector") effect, in the required sense of sucking coolant air through the system in which its flow is desired. The device may be adapted to aircraft use where the gas turbine is a jet propulsion engine installed in a chamber formed by a nacelle or fuselage, the coolant air being led from the engine to an outlet where it is subject to sucking effect due to the propulsive stream. In a particular and preferred embodiment this results in a highly convenient arrangement, in which the coolant air is led into a chamber surrounding the rear portion of the jet pipe and within a skin forming, in effect, the rear part of the streamline form of the nacelle or fuselage. The invention also includes other variants which will be described below with reference to the drawings.

The invention is illustrated by way of example in three forms, in the accompanying drawing.

Fig. 1 is a sectional view showing the relevant parts of a propulsion exhaust pipe, aircraft nacelle or fuselage, and ducting.

Fig. 2 is a fragmentary sectional view of a variant.

Fig. 3 is a fragmentary sectional view of a further variant.

Fig. 4 schematically illustrates a typical Whittle-type gas turbine power unit for jet propulsion, installed in a nacelle.

It will be convenient first to regard Fig. 4, in which there is shown a nacelle with a wall or skin 1, having an opening 41 facing forwardly in flight to generate ram pressure in the nacelle, which is thus pressurised. In the nacelle is mounted the power unit which comprises a single stage centrifugal compressor at 42, with its bilateral intakes indicated by arrows 43. The compressor 42 supplies compressed air into combustion chambers 44 enclosing flame tubes 45 from which the working gases flow through elbow ducts 46 into the turbine at 47, from the annulus of which they are collected in an exhaust or jet pipe 4 whence they emerge as the propulsive jet to atmosphere.

The turbine is overhung on its shaft 47A, which is borne by a turbine bearing surrounded by a generally annular air cavity into which lead coolant air intake pipes 48, taking in air from the nacelle. This air, flowing through the cavity, is impelled by blading 47B on the face of the turbine disc outwards, scrubbing the disc in its path, and it is then ducted away by pipes 49 which lead it for collection in a circular manifold pipe 49A, from which lead ducts 6.

The pipes 48 and 49 are usually as many in number as there are combustion chambers 44, in the interests of symmetry of arrangement. The coolant air serves in its passage in the unit, to keep the turbine bearing region cool and to cool the turbine disc. If the invention be fully applied, the blading 47B may be found to be omissible since no other pumping of coolant air may be necessary than that afforded by the working gases.

It is to be understood that the illustration of Fig. 4 and its description are given purely by way of example and explanation, the power unit itself, and its detail, not being within the invention.

In relation to the example of Fig. 1, it is desirable to observe that the installation of jet propulsion systems in aircraft is surrounded by problems of detail which though of a secondary nature nevertheless have to be met. For example, if the propulsion unit or engine is housed in a nacelle or fuselage, and in the nature of things, a jet pipe (exhaust pipe) is led to the rear extremity of such housing, the comparatively high temperature at which the pipe is likely to run, makes it desirable that the nacelle structure where it is close to the pipe, should be of heat resistant material, and air should circulate fairly freely between pipe and skin. Thus where the nacelle (such as 1) as a whole is of light alloy, its final after-part may be of steel. Again, it is necessary to allow for considerable longitudinal thermal expansion of the pipe, relative to the nacelle structure, and proportional radial expansion. The construction of Fig. 1 seeks to deal with these points as well as to afford the main feature of the invention.

The main structure of the nacelle is again indicated as comprising a skin 1, terminating at its rear end at a circular frame of annular bulkhead 2. The skin 1 may be assumed to be of light alloy and the frame 2 of steel. The streamline profile of the nacelle, i. e., its skin-line, is continued aft by a frustoconical fairing 3 of sheet steel or heat resisting material, attached to the frame 2. The inner margin of the frame 2 is circular and forms a support for the jet or exhaust pipe 4, which is mainly cylindrical but which terminates at its after end in a slight convergence forming the "propelling nozzle" with final outlet at 4A. The jet pipe 4 is so dimensioned in relation to the frame 2, that it remains a sliding fit in all anticipated conditions, so that it will have substantial radial clearance when cold, whilst it should be a fairly close fit such as to restrict air leakage when hot. Some form of soft packing may be provided to assist the prevention of air leakage but not to interfere with sliding, and such packing may also serve to prevent fretting of the pipe or frame. In some cases however, some air leakage from front to rear of the frame 2 may be desirable, for example to ensure ventilation of the engine compartment ahead of the frame. The propelling nozzle projects slightly from the fairing 3 in the running condition. An annular air gap is provided (somewhat exaggerated in the figure) at 5 between the edge of the fairing 3 and that of the propelling nozzle, and the relationship is such that the high-velocity propulsive stream emerging from 4A, acts as an ejector and entrains air which is sucked from the gap 5. Through the frame 2 are led the coolant air pipes 6 coming from the engine. The coolant air is thus collected in the chamber formed between 2, 3 and 4, and abstracted therefrom through 5.

Depending on the particular circumstances, the ejector action may be solely or only partly responsible for the passage of the coolant air through its system; it is at present proposed to use the known additional source of propulsion of this air, e. g., the impeller blading 47B on the flank of the gas-turbine disc, plus such pressure difference as may be derived from ram effect due to forward speed. In a slight modification the rear edge of the fairing 3 may overhang the exit 4A of the jet pipe.

Fig. 2 illustrates a somewhat different application of the invention in which use is made of a "break" in a jet pipe which may be desirable for other considerations, e. g., ease of installation. In this case the exhaust pipe 4 coming from an engine has a section 7A attached to its downstream end by flanges 7B. The section 7A has a slight convergence at 7C. The jet pipe 8, which is to form virtually a continuation of the pipe 7, 7A, has a flared upstream end at 8A, which leaves an air gap 9 as shown for the entry of air into the pipe. This air gap is surrounded externally by an annular chamber formed by a wall 10 attached to the section 7A and a wall 11 on the pipe 8 and arranged to be slidable thereon, there being a ring of heat-resisting packing 11A to draw up to the flare 8A when all is assembled. The wall 11 fits into wall 10 as shown, by a comparatively loose fit which need not be air-tight. The walls 10, 11, are held together by bolts 12 which also serve to hold the flanges 7B. The coolant air pipes 6 are led through the wall 10 into the annular chamber formed between 7A, 10, 11, and thus the coolant air, together with such other relatively restricted flow through leakage, is drawn into the pipe 8 by injector action. When the nuts 12A on bolts 12, are removed, the wall 11 may be slid back and the engine, together with all the parts such as 7, 7A, 10, 6, more or less permanently associate with it, may be lifted without disturbing the installation of the pipe 8. It should be noted that this type of construction should be employed only when the circumstances are such that no deleterious back-pressure effects are likely to expel hot gases from the exhaust, into the coolant system.

Fig. 3 shows a construction somewhat analogous to that of Fig. 1 and probably of chief interest in connection with a stationary plant. An exhaust pipe 4 from the engine has a final convergent nozzle portion 14A with exit 14B, which portion is surrounded by an annular chamber 15 into which one or more coolant air ducts 6 are led. The chamber 15 has an annular air exit 17 surrounding, and in the vicinity of, the exit 14B, as shown, and the arrangement is such that ejector action (as in Fig. 1) enables the exhaust stream to entrain the coolant air.

Provision may be made for adjustment of the ejector effect by varying the relationship (especially axially) of the coolant air exit and the propulsion nozzle exit or exhaust stream. Such provision may be especially desirable where the optimum effect is difficult to achieve by design and is to be determined experimentally; and in any case, the relationship established will of course take into account the relative positions and dimensions in the hot running conditions. Such provision, which will be varied to suit individual embodiments of the invention, already resides for example in Fig. 2, where the axial dimension of the air gap is variable by nut adjustment and by part 11 sliding in part 10.

I claim:

1. An aircraft-gas turbine jet propulsion engine installation comprising a nacelle of aerodynamic shape, a gas turbine jet propulsion engine having a turbine driving a compressor arranged in tandem therewith and housed within the nacelle, structure defining a passage for the flow of coolant air from within the nacelle over portions of the engine structure between said compressor and turbine and over the face of the turbine rotor adjacent said compressor, ducting for collecting said coolant air from the turbine rotor face adjacent the rotor blades of said turbine and forming an outlet passage for such air, a circular cross-sectioned exhaust duct from said turbine constituting a jet pipe approximately coextensive rearwardly with said nacelle within which it is housed and a chamber formed by the wall of the nacelle and said pipe, said chamber being arranged to receive the coolant air from said outlet passage and to emit it through an egress so disposed in relation to said jet pipe as to form an ejector whereby such emission is promoted by the propulsive exhaust jet emerging from the pipe 2. A gas turbine engine comprising a turbine, a compressor driven by said turbine and arranged coaxial therewith, the two having a common shaft, a bearing for said shaft disposed between the compressor and the turbine, a hollow structure joining said compressor and said turbine together and enclosing said bearing and a space around it between them, a combustion system having a plurality of combustion chambers disposed around said hollow structure, each chamber being connected to said compressor for receiving compressed air therefrom and each chamber enclosing a flame tube for the combustion of fuel therein and connected to said turbine for supplying working fluid thereto, an exhaust duct extending from said turbine, an engine casing surrounding said compressor, turbine and exhaust pipe and having an opening for said exhaust to project through, a chamber formed adjacent the end of said exhaust pipe by a wall of said engine casing and said exhaust pipe, a plurality of cooling air conduits defining inlet passages extending from said hollow structure between said combustion chambers to collect cooling air from within said engine casing and to pass it over said bearing within said hollow structure and over the rotor face of said turbine, ducting for collecting said cooling air from said turbine rotor face adjacent the turbine blades, a plurality of conduits defining passages extending from said collector ducting between said combustion chambers to said chamber adjacent the end of said exhaust pipe for passing said cooling air to said chamber, which emits it through an egress so disposed in relation to said exhaust pipe as to form an ejector whereby such emission is promoted by the exhaust gases emerging from said exhaust pipe.

3. A gas turbine engine comprising a turbine, a compressor driven by said turbine and arranged coaxial therewith, the two having a common shaft, a bearing for said shaft disposed between the compressor and the turbine, a hollow structure joining said compressor and said turbine together and enclosing said bearing and a space around it between them, a combustion system having a plurality of combustion chambers disposed around said hollow structure, each chamber being connected to said compressor for receiving compressed air therefrom and each chamber enclosing a flame tube for the combustion of fuel therein and connected to said turbine for supplying working fluid thereto, an exhaust duct extending from said turbine, a chamber formed adjacent the end of said exhaust pipe by a wall and said exhaust pipe, a plurality of cooling air ducts defining inlet passages extending from said hollow structure between said combustion chambers to collect cooling air and to pass it over said bearing within said hollow structure and over the rotor face of said turbine, ducting for collecting said cooling air from said turbine rotor face adjacent the turbine blades, a plurality of conduits defining passages extending from said collector ducting between said combustion chambers to said chamber adjacent the end of said exhaust pipe for passing said cooling air to said chamber, which emits it through an egress so disposed in relation to said exhaust pipe as to form an ejector whereby such emission is prompted by the exhaust gas emerging from said exhaust pipe.

DANIEL NORMAN WALKER.

REFERENCES CITED

The following references are of record in the file of this patent:

UNITED STATES PATENTS

| Number | Name | Date |
| --- | --- | --- |
| 2,117,131 | Auger | May 10, 1938 |
| 2,180,168 | Puffer | Nov. 14, 1939 |
| 2,348,748 | Nichols | May 16, 1944 |
| 2,395,262 | Forsyth | Feb. 19, 1946 |
| 2,396,911 | Anxionnaz et al. | Mar. 19, 1946 |
| 2,401,941 | Lee | June 11, 1946 |

FOREIGN PATENTS

| Number | Country | Date |
| --- | --- | --- |
| 472,334 | Great Britain | Sept. 22, 1937 |

OTHER REFERENCES

Ser. No. 326,141, Ramshorn (A. P. C.), published May 11, 1943.